(12) United States Patent
Anesko et al.

(10) Patent No.: US 6,717,960 B1
(45) Date of Patent: Apr. 6, 2004

(54) METHOD FOR RECONSTRUCTING AN AGGREGATE ATM CELL STREAM AND RELATED DEVICE

(75) Inventors: Alexander Anesko, Brunswick, ME (US); Douglas M. Brinthaupt, Holmdel, NJ (US); Christine Mary Gerveshi, Scotch Plains, NJ (US); Ramasubramaniam Ramachandran, Flemington, NJ (US); Mourad Bushra Takla, Basking Ridge, NJ (US)

(73) Assignee: Agere Systems Inc., Allentown, PA (US)

(*) Notice: Subject to any disclaimer, the term of this patent is extended or adjusted under 35 U.S.C. 154(b) by 785 days.

(21) Appl. No.: 09/585,476

(22) Filed: Jun. 1, 2000

(51) Int. Cl.⁷ ............................................. H04L 12/56
(52) U.S. Cl. .................................. 370/536; 370/395.7
(58) Field of Search ............................... 370/238, 252, 370/394, 395.1, 395.4, 535, 536, 395.7

(56) References Cited

U.S. PATENT DOCUMENTS

| 5,608,733 A | 3/1997 | Vallee et al. ................ 370/394 |
| 5,875,192 A | 2/1999 | Cam et al. ................... 370/474 |
| 5,970,067 A | 10/1999 | Sathe et al. ................. 370/394 |
| 6,002,670 A | 12/1999 | Rahman et al. ............. 370/238 |
| 6,205,142 B1 * | 3/2001 | Vallee ........................ 370/394 |
| 6,222,858 B1 * | 4/2001 | Counterman ................ 370/474 |

FOREIGN PATENT DOCUMENTS

GB    2350757 A   *   6/2000    ............. H04J/3/06

OTHER PUBLICATIONS

"Inverse Multiplexing for ATM (IMA) Specification Version 1.1" AF–PHY–0086.001. ATM Forum. Mar. 1999. pp. 153–156.*

* cited by examiner

Primary Examiner—Chi Pham
Assistant Examiner—Derrick W Ferris
(74) Attorney, Agent, or Firm—William H. Bollman

(57) ABSTRACT

A method for reconstructing an aggregate stream of cells transmitted over communication links in an asynchronous transfer mode protocol includes determining a respective link delay for each of the communication links, including determining a fastest communication link. A common starting cell at which the cells from the communication links will correspond in time is determined based upon the fastest communication link. The method further includes filling a respective delay compensation buffer with corresponding cells for each of the communication links beginning with the common starting cell. The cells are read from the delay compensation buffers in a round-robin fashion to reconstruct the aggregate stream of cells.

40 Claims, 3 Drawing Sheets

METHOD FOR RECONSTRUCTING AN AGGREGATE ATM CELL STREAM AND RELATED DEVICE

FIELD OF THE INVENTION

The present invention relates to the field of digital communication, and, more particularly, digital communication over a network using inverse multiplexed asynchronous transfer mode protocol.

BACKGROUND OF THE INVENTION

Communications networks, such as wide area networks (WANs) allow for the transfer of digital data from numerous sources through shared or common communication links. The standard network communication links in use in the United States are the T1 and T3 links. In Europe, E1 and E3 links are the standard and they roughly correspond in size to the T1 and T3 links, respectively. The T1/E1 link provides a relatively slow maximum data rate transfer compared to that of the T3/E3 link, but the T1/E1 link is also much less expensive.

Until recent years, businesses whose networks required more capacity than a single T1/E1 link, but less than that of a T3/E3 link were faced with a problem. They either had to make do with the insufficient capacity of the T1/E1 link, purchase a more expensive T3/E3 link which would be underutilized, or attempt to use incremental T1/E1 circuits to provide an intermediate capacity between the two. While the later option provided the best balance between cost and capacity, it also came with a loss in ability to aggregate and manage traffic across the communication links.

One technology which has been developed to address this problem is the asynchronous transfer mode (ATM) network which allows for enhanced control of data over multiple communication lines, such as T1/E1 lines. Recently, the ATM Forum Technical Committee developed a set of universal standards or protocol for performing inverse multiplexing over ATM (IMA) networks entitled "Inverse Multiplexing for ATM (IMA) Specification," Version 1.1, March 1999 (the "IMA Specification"), which is hereby incorporated herein by reference in its entirety. IMA allows an aggregate stream of ATM cells to be divided at a transmitting end of a network across multiple connection links on a cell-by-cell basis and then reassembled into the aggregate stream at a receiving end of the network without losing the original ATM cell order.

One problem that the IMA Specification seeks to address is the fact that differences in the link delays from one link to another cause the ATM cells to arrive out of order at the receiving end. Delay compensation must be performed based upon the various delays across the links so that synchronization of the ATM cells can be restored. The IMA Specification provides a sample approach for performing this link differential delay (LDD) compensation. This approach was intended as a guide and does not address many of the practical problems encountered when implementing an IMA system. For example, the sample approach does not provide a way for aligning and starting the pointers of the delay compensation buffers used in reconstructing the aggregate cell stream on the receiving end. Furthermore, the cells are transmitted in frames, and if the first IMA control protocol (ICP) cell received on a link is missing or corrupted, the LDD computation will be in error by a frame for that link.

An alternative approach to that of the IMA Specification for performing the LDD compensation is found in U.S. Pat. No. 6,002,670 to Rahman et al. entitled "Optimization and Recovery Techniques in IMA Networks." The patent discloses calculating a LDD for each communication link based upon the shortest link delay among all of the communication links. This and other prior art approaches do not provide a way to overcome the above problems, however.

SUMMARY OF THE INVENTION

In view of the foregoing background, it is therefore an object of the invention to provide a method and device for reconstructing an aggregate stream of cells transmitted using ATM protocol that provides a relatively simple way to align the pointers of the delay compensation buffers used to reconstruct the cell stream.

It is another object of the invention to provide such a method and device that requires smaller delay compensation buffers than in the prior art.

It is still another object of the invention to provide such a method and device that reduces errant link differential delay calculations caused by missing or corrupted ICP cells.

These and other objects, features, and advantages in accordance with the present invention are provided by a method for reconstructing an aggregate stream of cells transmitted over a plurality of communication links in an ATM protocol. The method includes determining a respective link delay for each of the communication links, including determining a fastest communication link; and determining a common starting cell at which the cells from the communication links will correspond in time and based upon the fastest communication link. The method also includes filling a respective delay compensation buffer with corresponding cells for each of the communication links beginning with the common starting cell and reading the cells from the delay compensation buffers in a round-robin fashion to reconstruct the aggregate stream of cells. By using the common starting cell, the read pointers of the delay compensation buffers may easily be aligned for round-robin reading, thus avoiding a complicated on-the-fly adjustment of the read pointers and reducing the possibility of errors during reading.

The method may further include comparing each link delay to the link delay for the fastest communication link to determine a delay difference therebetween and generating a signal responsive thereto if the difference is greater than a threshold. The threshold may be about 300 milliseconds. The delay compensation buffers correspond in size to a number of cells that can be written within the threshold. For example, for a threshold of 25 milliseconds on a T1 link the number of cells would be 91 cells. The communication links may be T1 or E1 links.

Each cell that is transmitted has a cell offset value and a frame value associated therewith. The respective link delays may be determined by using the cell offset value and the frame value to establish a number of cells received since the transmission began. Furthermore, the common starting cell may be determined by determining a current cell offset value and a current frame value for each of the communication links, preferably within a one cell period. Then, a current cell offset value and a current frame value of the fastest communication link may be compared to a respective current cell offset value and a current frame value for each of the other communication links.

The filling may include setting a respective write pointer of each delay compensation buffer to a location of the common starting cell. By beginning the writing with the common starting cell, the size of the delay compensation buffers need only be large enough to accommodate a number of cells that can be written within the threshold, resulting in smaller buffers than are required in prior art devices. The reading may include setting a respective read pointer of each delay compensation buffer to a location of the common starting cell to begin the round-robin reading. The reading preferably begins once the delay compensation buffer for the slowest communication link has begun filling.

A device for reconstructing an aggregate stream of cells transmitted over a plurality of communication links in an ATM protocol according to the present invention includes a respective delay compensation buffer for each communication link and a processor. The processor determines a respective link delay for each of the communication links, including a fastest communication link. The processor also determines a common starting cell at which the cells from the communication links will correspond in time and based upon the fastest communication link. Furthermore, the processor fills each delay compensation buffer with corresponding cells for each of the communication links beginning with the common starting cell.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
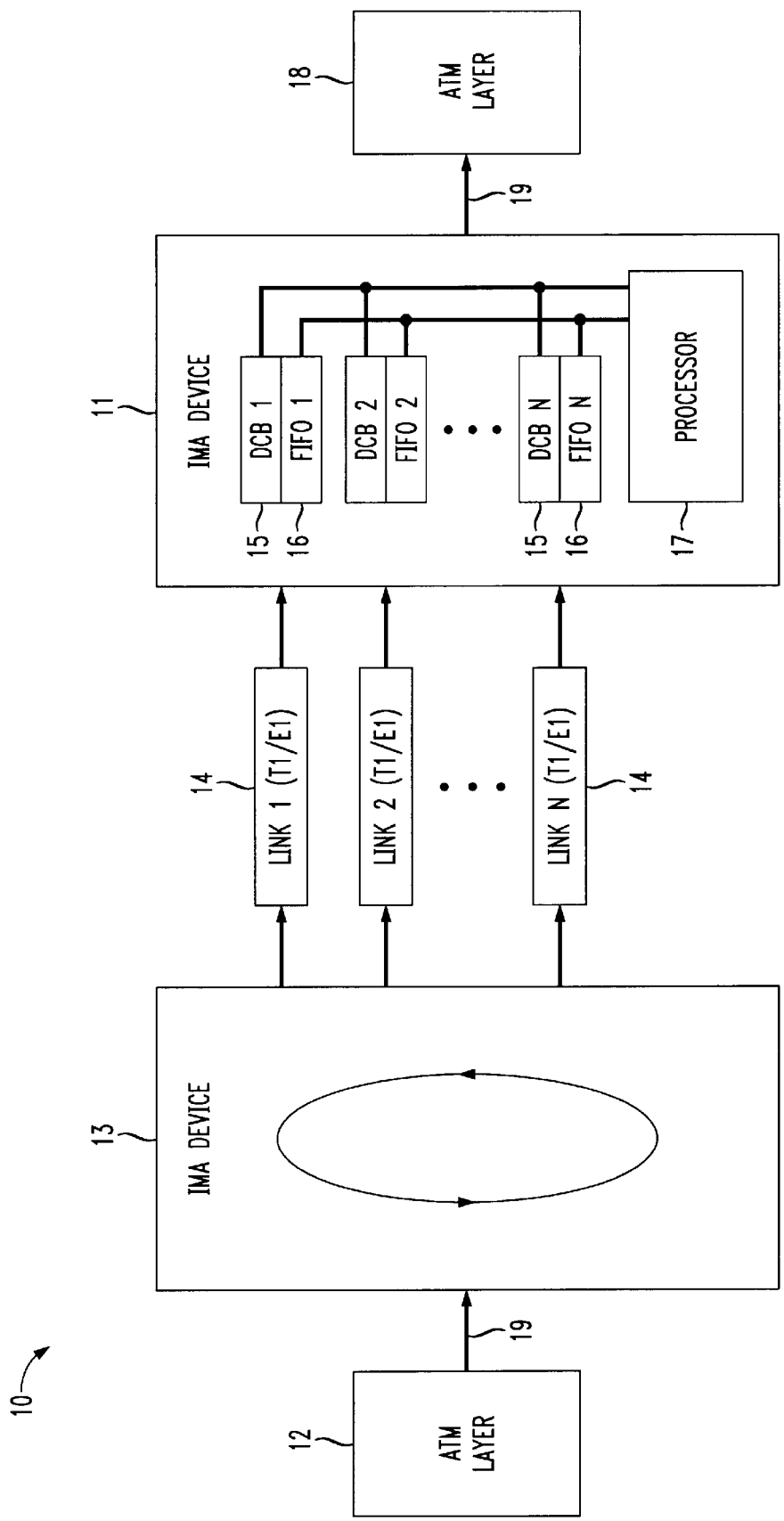
FIG. 1 is a schematic diagram of an IMA system including an IMA device according to the invention.

Referring now to the block diagram of FIG. 1, an IMA system 10 including an IMA device 11 according to the invention is described. An aggregate ATM cell stream 19 is provided by an ATM layer 12 to a transmitting IMA device 13, which distributes the aggregate ATM cell stream on a cell-by-cell basis across multiple communication links 14. The communication links 14 may be T1, E1, or J1 links, for example, although other links may be used as well.

The designations "transmitting" and "receiving" are used herein for the IMA devices 13, 11, respectively, for simplicity of illustration. However, those of skill in the art will appreciate that a single IMA device may perform both transmitting and receiving operations.

The transmitting IMA device 13 periodically transmits ICP cells that include information used to reconstruct the aggregate ATM cell stream at the receiving IMA device 11. The ICP cells divide the aggregate ATM cell stream 19 into frames, which are defined by the IMA Specification as a number M of consecutive IMA cells (numbered 0 to M−1) transmitted on each of the communication links in an IMA group. An IMA group is the group of communication links used for transmitting IMA cells. All of the links in an IMA group are typically of the same type. The transmitting IMA device 13 aligns transmission of the cells on each of the links in a cyclical or round-robin fashion. Each ATM cell has a corresponding frame value and an offset value within the frame (i.e., a cell offset value).

Due to differences in path delays from one communication link 14 to the next, the IMA cells transmitted across the communication links may arrive at the receiving IMA device 11 out of order. The IMA Specification requires that the difference between the link delays, i.e., the link differential delays (LDDs), not exceed a maximum value or threshold, for example 25 milliseconds. Accordingly, before the receiving IMA device 11 can begin reconstructing the aggregate ATM cell stream, the links having a LDD greater than the threshold should be removed from the IMA group. Then, the delays of the remaining communication links 14 must be accounted for so that the incoming IMA cells can be correctly ordered by the receiving IMA device 11 to provide accurate reconstruction of the aggregate cell stream 19.

In order to accomplish these tasks prior to reconstructing the aggregate ATM cell stream, the receiving ATM device 11 includes delay compensation buffers 15, first-in first-out devices or FIFOs 16, and a processor 17. Those of skill in the art will appreciate that memory devices other than the FIFOs 16, such as registers, may also be used. The operation of these components and reconstruction of the aggregate ATM cell stream 19 will be described further with reference to FIGS. 2 and 3, below. After reconstruction, the aggregate ATM cell stream 19 is output to an ATM layer 18.

Figure 2:
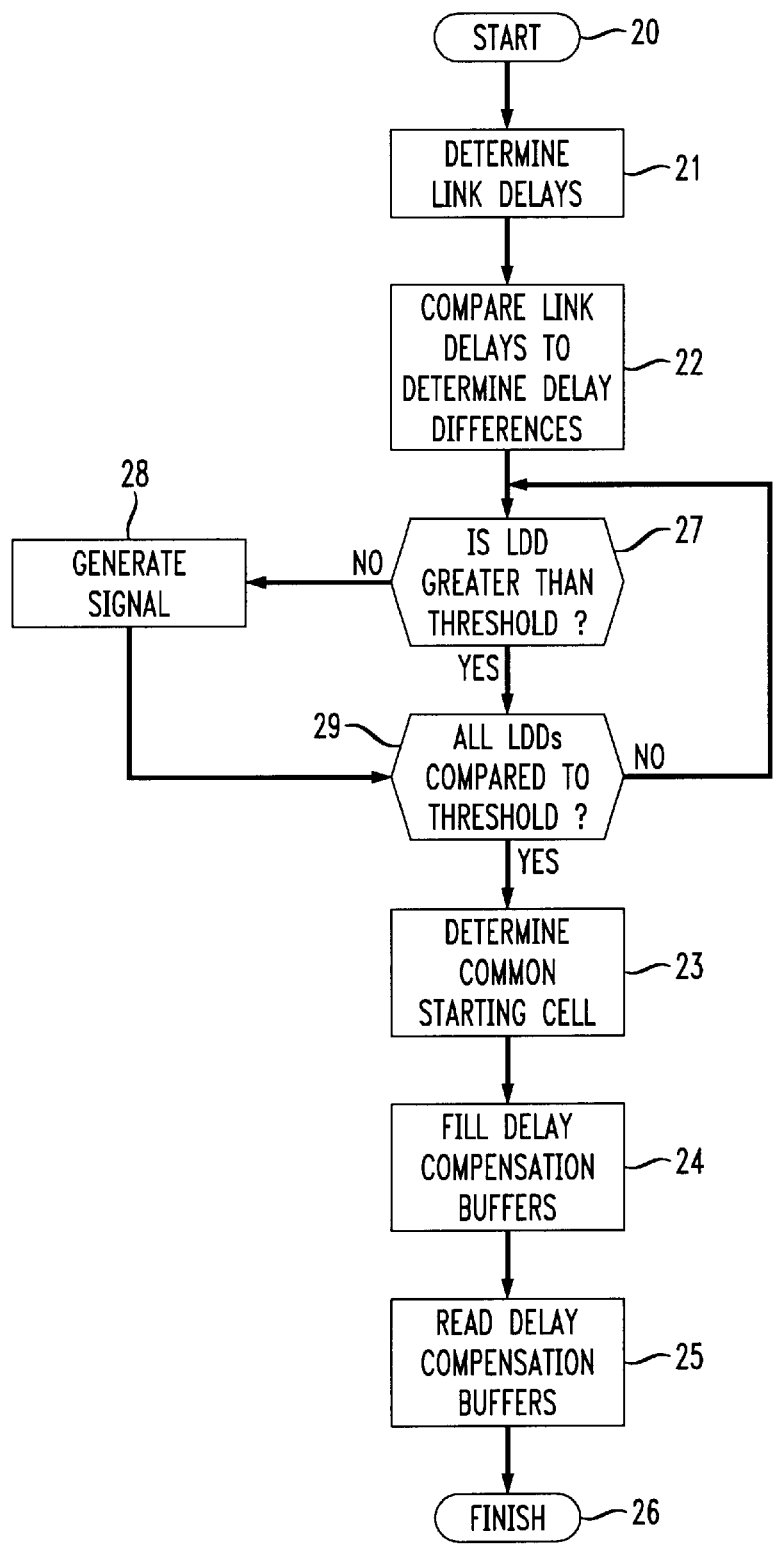
FIG. 2 is a flow diagram of a method according to the invention.
Figure 3:
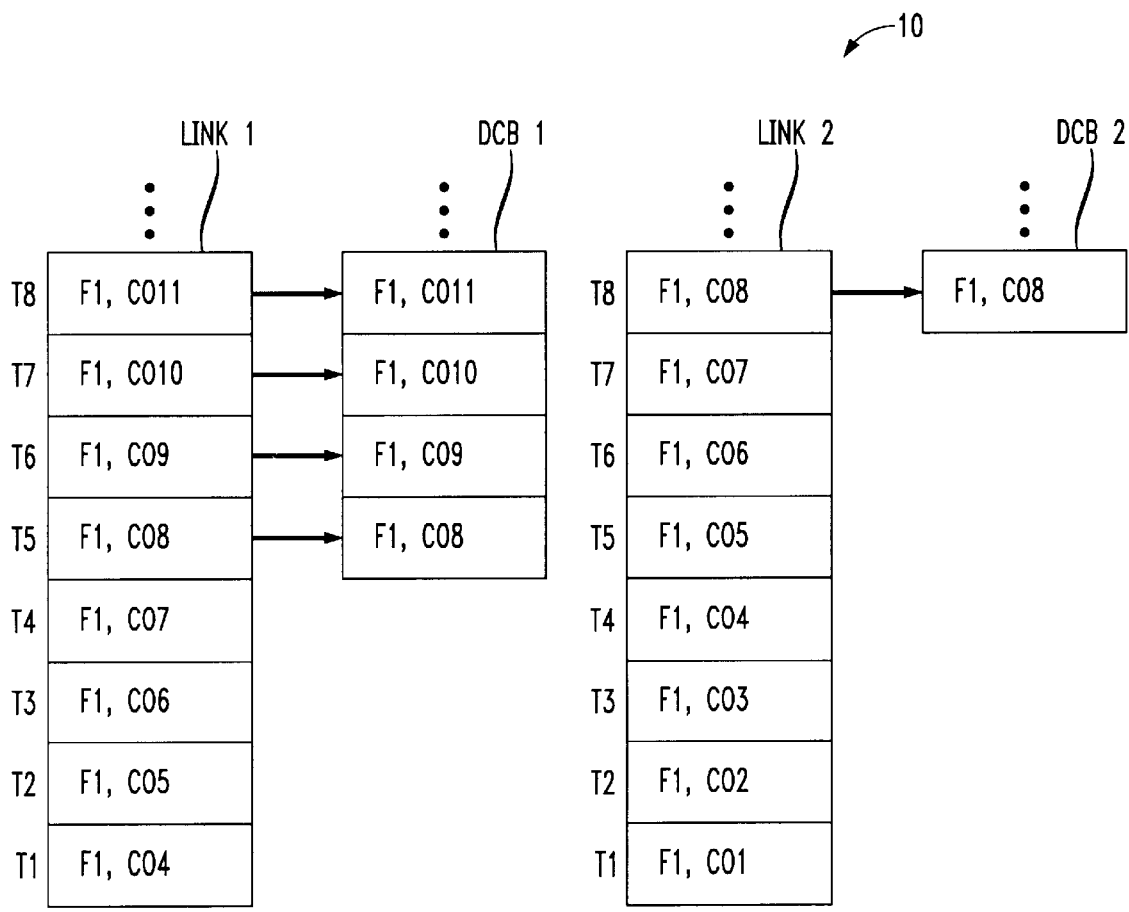
FIG. 3 is a schematic diagram illustrating filling of the delay compensation buffers with incoming IMA cells from two communication links of an IMA system according to the invention.

Turning to FIGS. 2 and 3, a method according to the invention for reconstructing the aggregate ATM cell stream 19 using the IMA device 11 is now described. The method begins (Block 20) after a first ICP cell has been received by the processor 17 from each of the communication links 14. The ICP cells received from a given communication link are stored in respective FIFOs 16. The processor 17 then determines a respective link delay for each of the communication links 14, including determining a fastest and a slowest communication link, as shown at Block 21. The processor 17 determines a current cell offset value and a current frame value for the last IMA cell received on each link. This determination is preferably made within a one cell period so that the LDD calculations will be accurate to within one cell period. Knowing the current cell offset and frame values allows the processor 17 to determine how many IMA cells have been received since the transmission began, and thereby determine the relative link delays of each of the communication links 14.

After the link delays are determined, the processor 17 compares each link delay to the link delay for the fastest communication link to determine the LDD therebetween, as seen at Block 22. Those skilled in the art will appreciate that the LDDs may also be calculated with reference to other communication links, including the slowest communication link. As noted above, the IMA standards require that a LDD or threshold of 25 milliseconds must be accommodated, although the receiving IMA device 11 of the present invention may accommodate thresholds of 300 milliseconds or more. The processor 17 then compares the LDD for each communication link 14 to the desired threshold to determine if the LDD for the communication link is greater than the threshold, as shown at Block 27. If so, the processor 17 generates a signal instructing the transmitting IMA device 13 to remove the communication link 14 from the IMA group, as shown at Block 28. After a signal has been generated or after the processor 17 determines that the LDD is less than the threshold, the processor moves to the next communication link 14 until all of the links have been compared to the threshold (Block 29), thus establishing the IMA group.

After the IMA group is established, the IMA device 11 may then begin to account for the various delays of the remaining communication links 14. This is done by determining a common starting cell at which the IMA cells from the communication links 14 will correspond in time (Block 23). Again using the current cell offset and current frame values for the fastest communication link, the cell offset and frame values corresponding to the common starting cell may be calculated using the following equations:

$$CO_{CSC} = \text{mod}((CO_{FL} + \text{LATENCY})/M) \quad (1)$$

$$F_{CSC} = F_{FL} + \text{int}((CO_{FL} + \text{LATENCY})/M) \quad (2)$$

where $CO_{CSC}$ is the cell offset value for the common starting cell, $F_{CSC}$ is the frame value for the common starting cell, $CO_{FL}$ is the cell offset value for the current cell of the fastest communication link, $F_{FL}$ is the frame value for the current cell of the fastest communication link, M is the number of cells in the frame, and LATENCY corresponds to a predetermined number of cells used to account for the time the processor 17 spends calculating the LDDs. After the common starting cell has been determined, the processor 17 begins filling each delay compensation buffer 15 with the IMA cells from its respective communication link 14 beginning with the common starting cell.

The processor 17 may include a hardware component as well as a software component which cooperate to perform the operations described herein, as will be readily appreciated by those of skill in the art. For example, the processor 17 may include a counter for keeping the current cell offset and frame values for the current cell. Furthermore, hardware may be included for comparing the value of the common starting cell provided by the software to the current counter value to determine when the common starting cell has been received. The hardware may then direct the write pointers of the delay compensation buffers 15 appropriately, as described further below.

Referring now to FIG. 3, an example of the determination of the common starting cell and filling of the delay compensation buffers 15 is described. For simplicity, only two communication links LINK 1, LINK 2 are included in the IMA group in the example. At a time T1 after both of the respective initial ICP cells have been received for the links LINK 1, LINK 2, for LINK 1 the current frame value is 1 ("F1") and the current cell offset is 4 ("CO4"), whereas the current cell offset and frame values for LINK 2 are CO1 and F1. Accordingly, LINK 1 is the fastest communication link among the two (because it has received more cells in the same amount of time), and there is a three cell period LDD between LINK 1 and LINK 2. Using equations (1) and (2), if a value of 4 cell periods is used for LATENCY and M is 256 cells, then:

$$CO_{CSC} = \text{mod}((4+4)/256) = 8$$

and $$F_{CSC} = 1 + \text{int}((4+4)/256) = 1$$

Accordingly, the common starting cell will have a cell offset value of CO8 and a frame value of F1. The processor 17 will begin sequentially filling the DCB 1 at time T5 and the DCB 2 at a time T8, both of which correspond to the time when the common starting cell is received from LINK 1 and LINK 2, respectively.

The method of compensating for the link delays set forth in the IMA Specification calls for filling the delay compensation buffers immediately as the IMA cells are received from respective communication links. The read pointers of the delay compensation buffers are then to be aligned on-the-fly so the IMA cells can be read in the correct round-robin order. Those of skill in the art will appreciate that this prior art method requires large delay compensation buffers and that alignment of the read pointers on-the-fly is difficult to implement in practice.

In contrast, because the IMA device according to the present invention delays writing the incoming IMA cells to the delay compensation buffers until the link delays have been accounted for, much smaller delay compensation buffers may be used. That is, the delay compensation buffers need only correspond in size to the number of cell periods equal to the desired threshold. Thus, for a threshold of 25 milliseconds, the delay compensation buffers only need to accommodate 91 cells for T1 links.

Furthermore, by delaying writing to the delay compensation buffers until the common starting cell has been received, there is no need to adjust the read pointers on-the-fly. The IMA cells stored in the delay compensation buffers will already be ordered such that when they are read in round-robin order the aggregate ATM cell stream 19 will be correctly reconstructed. Thus, the present invention avoids errors in the round-robin reading that are present in the above prior art method.

One further advantage of the present invention is that storing ICP cells for each communication link 14 in respective FIFOs 16 makes this information readily available to the processor 17 and avoids additional processor time required for continually locating the ICP cells. Moreover, because the IMA device 11 according to the invention does not account for the link delays until after an initial ICP cell is received for each of the communication links 14, corrupted or missing ICP cells will not cause the delay calculations to be errant by a frame.

Referring once again to FIG. 2, the IMA cells are written to the delay compensation buffers 15 by setting their respective write pointers to the location of the common starting cell. Reading of the IMA cells from the delay compensation buffers 15 occurs once the first cell has been written to the delay compensation buffer for the slowest communication link. The respective read pointer of each delay compensation buffer 15 is set to the location of the common starting cell. The reading is done in a round-robin fashion and results in reconstruction of the aggregate stream of cells 19, which is then provided to an ATM layer 18.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for reconstructing an aggregate stream of cells transmitted over a plurality of communication links in an asynchronous transfer mode (ATM) protocol, the method comprising:
   determining a respective link delay for each of the plurality of communication links;
   determining a common starting cell at which the cells from the plurality of communication links will correspond in time and based upon one of a fastest communication link and a slowest communication link;

filling a respective one of a plurality of delay compensation buffers with corresponding cells for each of the plurality of communication links beginning with the common starting cell; and reading the cells from the plurality of delay compensation buffers in a round-robin fashion to reconstruct the aggregate stream of cells.

2. The method of claim 1 wherein determining the respective link delay comprises:

determining a slowest communication link;

wherein the reading is based on the slowest communication link.

3. The method of claim 1 further comprising:

comparing each link delay to a link delay for the fastest communication link to determine a delay difference therebetween; and generating a signal responsive thereto if the delay difference is greater than a threshold.

4. The method of claim 3 wherein:

the threshold is about 300 milliseconds.

5. The method of claim 3 wherein:

each of the plurality of delay compensation buffers corresponds in size to a number of cells that can be written within the threshold.

6. The method of claim 5 wherein:

the number of cells that can be written within the threshold is 91.

7. The method of claim 1 wherein:

each of the number of cells has a cell offset value and a frame value associated therewith; and wherein determining the respective link delays comprises using the cell offset value and the frame value to establish a number of cells received since a transmission on the respective link began.

8. The method of claim 1 wherein:

each of the number of cells has a cell offset value and a frame value associated therewith; and wherein determining the common starting cell comprises determining a current cell offset value and a current frame value for each of the plurality of communication links.

9. The method of claim 8 wherein determining the common starting cell comprises:

comparing a current cell offset value and a current frame value of the fastest communication link to a respective current offset value and a current frame value for each of the other communication links.

10. The method of claim 8 wherein:

the determining the current cell offset value and the current frame value is performed within a one cell period.

11. The method of claim 1 wherein the filling the respective one of the plurality of delay compensation buffers comprises:

setting a respective write pointer of each of the plurality of delay compensation buffers to a location of the common starting cell.

12. The method of claim 1 wherein the reading the cells from the plurality of delay compensation buffers comprises:

setting a respective read pointer of each of the plurality of delay compensation buffers to a location of the common starting cell to begin the round-robin reading.

13. The method of claim 1 wherein:

at least one of the plurality of communication links is a T1 link.

14. The method of claim 1 wherein:

at least one of the plurality of communication links is an E1 link.

15. A method for processing an aggregate stream of cells transmitted over a plurality of communication links in an asynchronous transfer mode (ATM) protocol, the method comprising:

determining a respective link delay for each of the plurality of communication links;

comparing each link delay to link delay for one of a slowest communication link and a fastest communication link to determine a delay difference therebetween and generating a signal responsive thereto if the delay difference is greater than a threshold;

determining a common starting cell at which the cells from the plurality of communication links will correspond in time; and filling a respective delay compensation buffer with corresponding cells for each of the plurality of communication links beginning with the common starting cell.

16. The method of claim 15 wherein:

the threshold is about 300 milliseconds.

17. The method of claim 15 wherein:

each of the delay compensation buffers corresponds in size to a number of cells that can be written within the threshold.

18. The method of claim 17 wherein:

the number of cells that can be written within the threshold is 91.

19. The method of claim 15 wherein:

each cell has a cell offset value and a frame value associated therewith; and wherein the determining the respective link delays comprises using the cell offset value and the frame value to establish a number of cells received since a transmission on the respective link began.

20. The method of claim 15 wherein:

each cell has a cell offset value and a frame value associated therewith; and wherein the determining the common starting cell comprises determining a current cell offset value and a current frame value for each of the plurality of communication links.

21. The method of claim 20 wherein the determining the common starting cell comprises:

comparing a current cell offset value and a current frame value of the fastest communication link to a respective current offset value and a current frame value for each of the other communication links.

22. The method of claim 20 wherein:

the determining the current cell offset value and current frame value is performed within a one cell period.

23. The method of claim 15 wherein the filling the respective delay compensation buffer comprises:

setting a respective write pointer of each delay compensation buffer to a location of the common starting cell.

24. The method of claim 15 wherein:

each of the plurality of communication links is a T1 link.

25. The method of claim 15 wherein:

each of the plurality of communication links is an E1 link.

26. A device for reconstructing an aggregate stream of cells transmitted over a plurality of communication links in an ATM protocol, the device comprising:

a respective delay compensation buffer for each of the plurality of communication links; and a processor for determining a respective link delay for each of the plurality of communication links including:
  means for determining a common starting cell at which cells from the plurality of communication links will correspond in time; and
  means for filling each delay compensation buffer with corresponding cells for each of the plurality of communication links beginning with the common starting cell.

27. The device of claim 26 wherein:
the processor compares each link delay to a link delay for a fastest communication link to determine a delay difference therebetween and generates a signal responsive thereto if the delay difference is greater than a threshold.

28. The device of claim 27 wherein:
the threshold is about 300 milliseconds.

29. The device of claim 27 wherein:
each delay compensation buffers corresponds in size to a number of cells that can be written within the threshold.

30. The device of claim 29 wherein:
the number of cells that can be written within the threshold is 91.

31. The device of claim 26 wherein:
each cell has a cell offset value and a frame value associated therewith; and
wherein the processor determines the respective link delay by using the cell offset value and the frame value to establish a number of cells received since a transmission on the respective link began.

32. The device of claim 26 wherein:
each cell has a cell offset value and a frame value associated therewith; and
wherein the processor determines the common starting cell by determining a current cell offset value and a current frame value for each of the plurality of communication links.

33. The device of claim 32 wherein:
the processor determines the common starting cell by comparing a current cell offset value and a current frame value of a fastest communication link to a respective current offset value and a current frame value for each of the other communication links.

34. The device of claim 32 wherein:
the processor collects the current cell offset value and current frame value within a one cell period.

35. The device of claim 26 wherein:
the processor sets a respective write pointer of each delay compensation buffer to a location of the common starting cell.

36. The device of claim 26 wherein:
cells are grouped in respective frames;
each frame contains a control protocol cell; and
the processor delays until a control protocol cell has been received from each of the plurality of communication links before determining the respective link delays.

37. The method of claim 36 further comprising:
respective first-in first-out (FIFO) device for each of the plurality of communication links for storing respective control protocol cells.

38. The device of claim 36 wherein:
said processor is synchronized with each frame of cells by an interrupt generated when each respective control protocol cell is processed.

39. The device of claim 26 wherein:
at least one of the plurality of communication links is a T1 link.

40. The device of claim 26 wherein:
at least one of the plurality of communication links is an E1 link.

* * * * *